July 3, 1951  A. A. HODGE  2,558,849
APPARATUS FOR USE IN THE MANUFACTURE OF LAMINATED TUBES,
TUBULAR INSULATIONS, TUBULAR BUSHINGS, AND LIKE
TUBULAR MEMBERS FROM FLEXIBLE STRIP MATERIAL
Filed Jan. 24, 1949  5 Sheets-Sheet 1
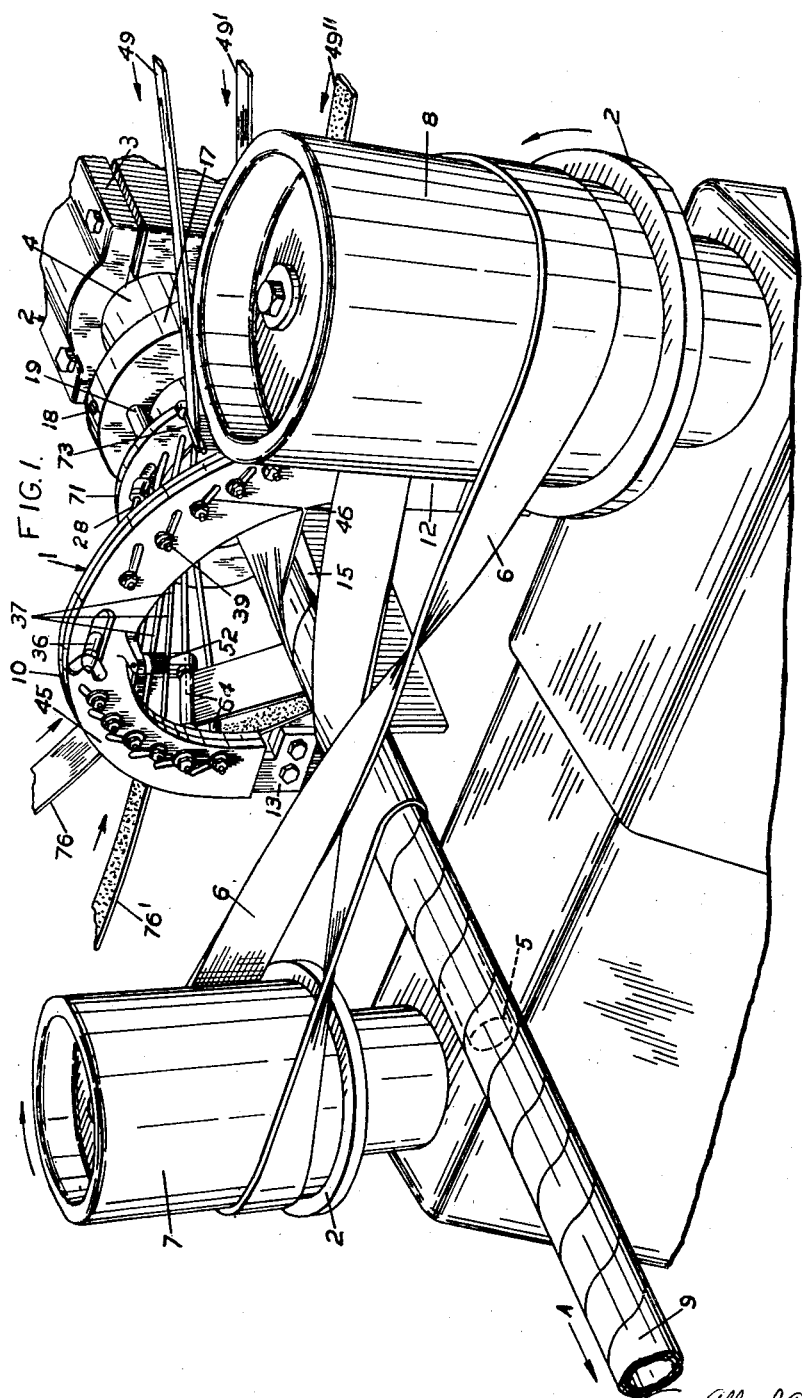
Inventor
Alfred Ansell Hodge
By
Ward, Crosby + Neal
Attorneys

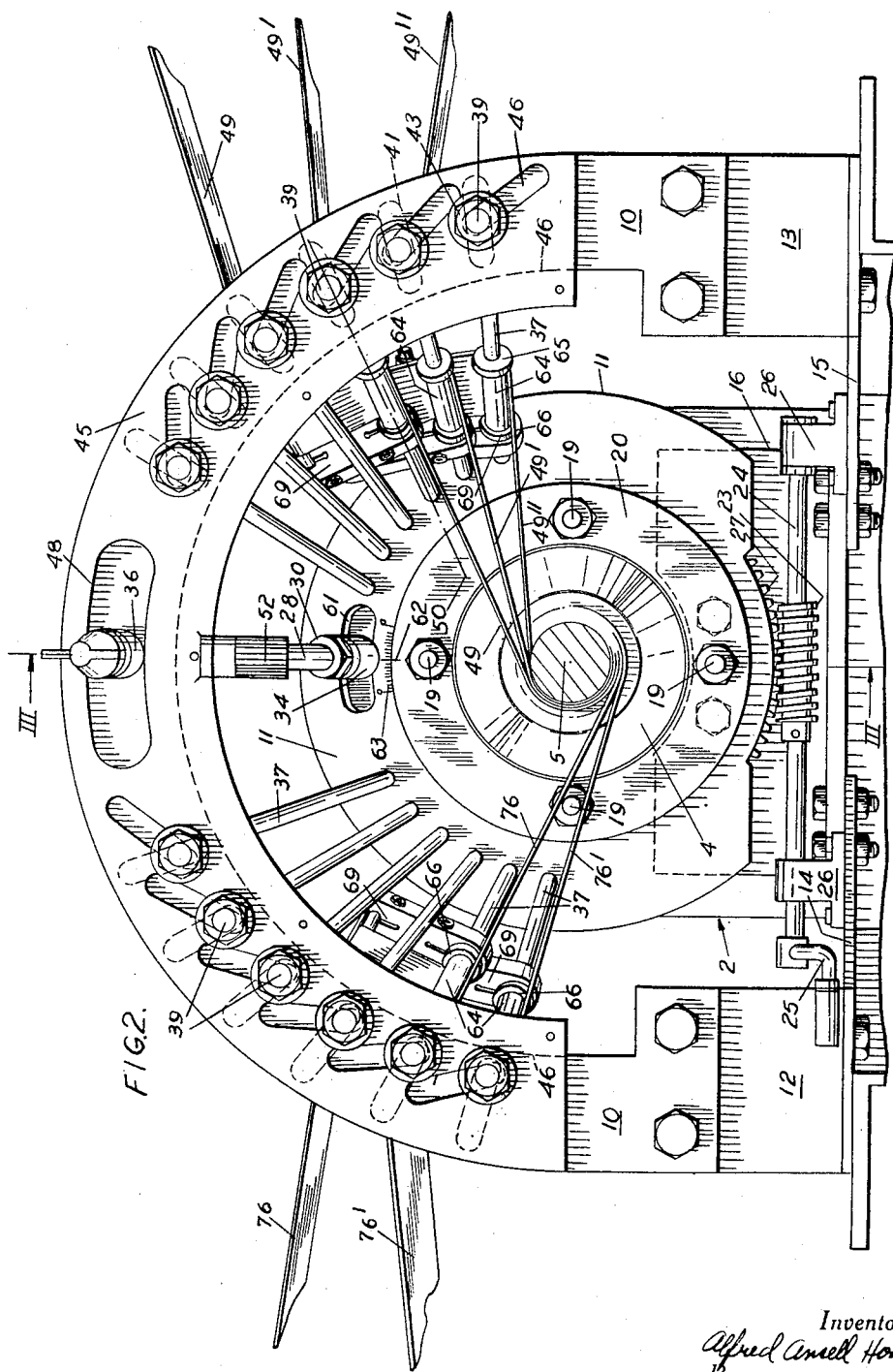

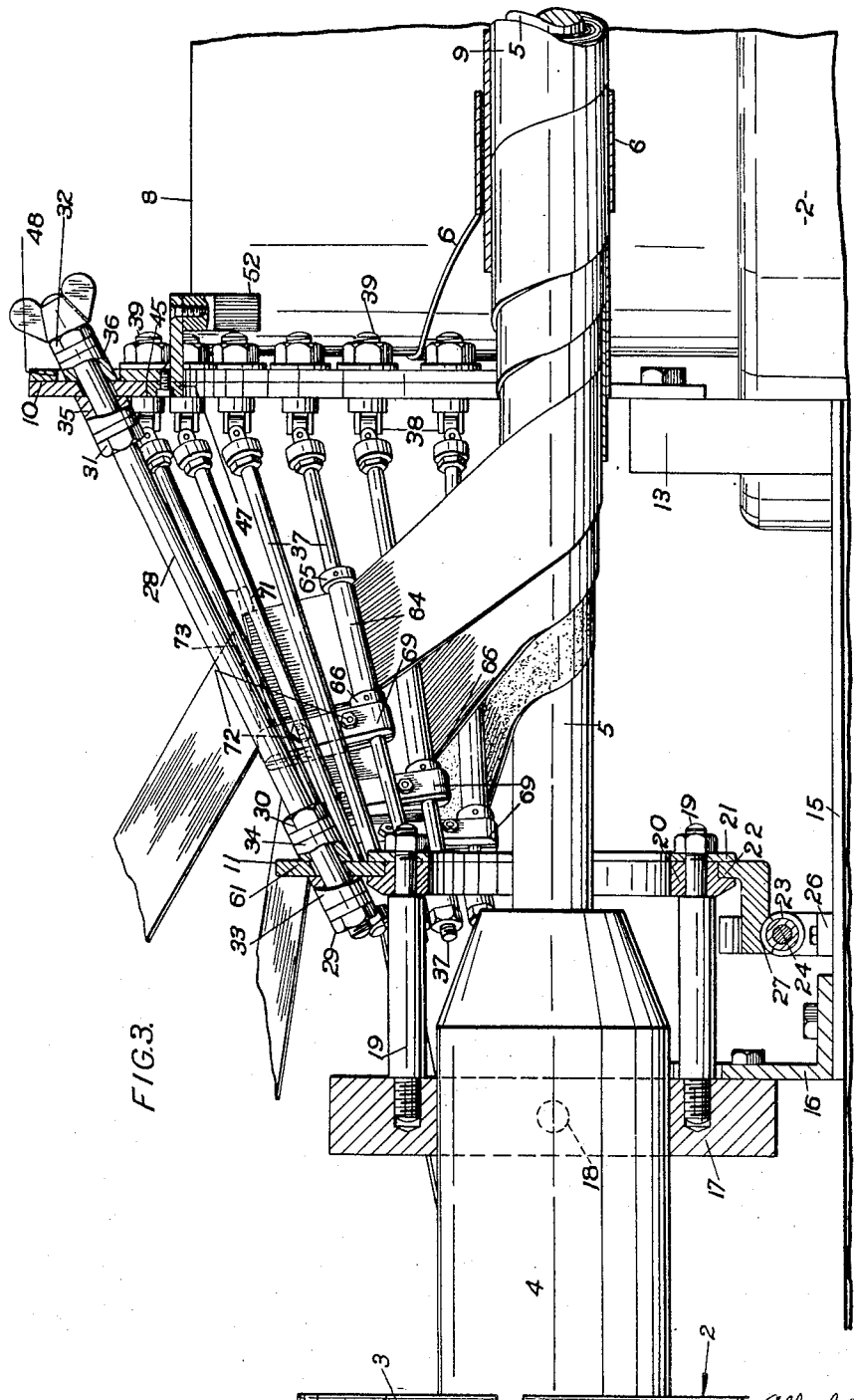

July 3, 1951 A. A. HODGE 2,558,849
APPARATUS FOR USE IN THE MANUFACTURE OF LAMINATED TUBES,
TUBULAR INSULATIONS, TUBULAR BUSHINGS, AND LIKE
TUBULAR MEMBERS FROM FLEXIBLE STRIP MATERIAL
Filed Jan. 24, 1949 5 Sheets-Sheet 4
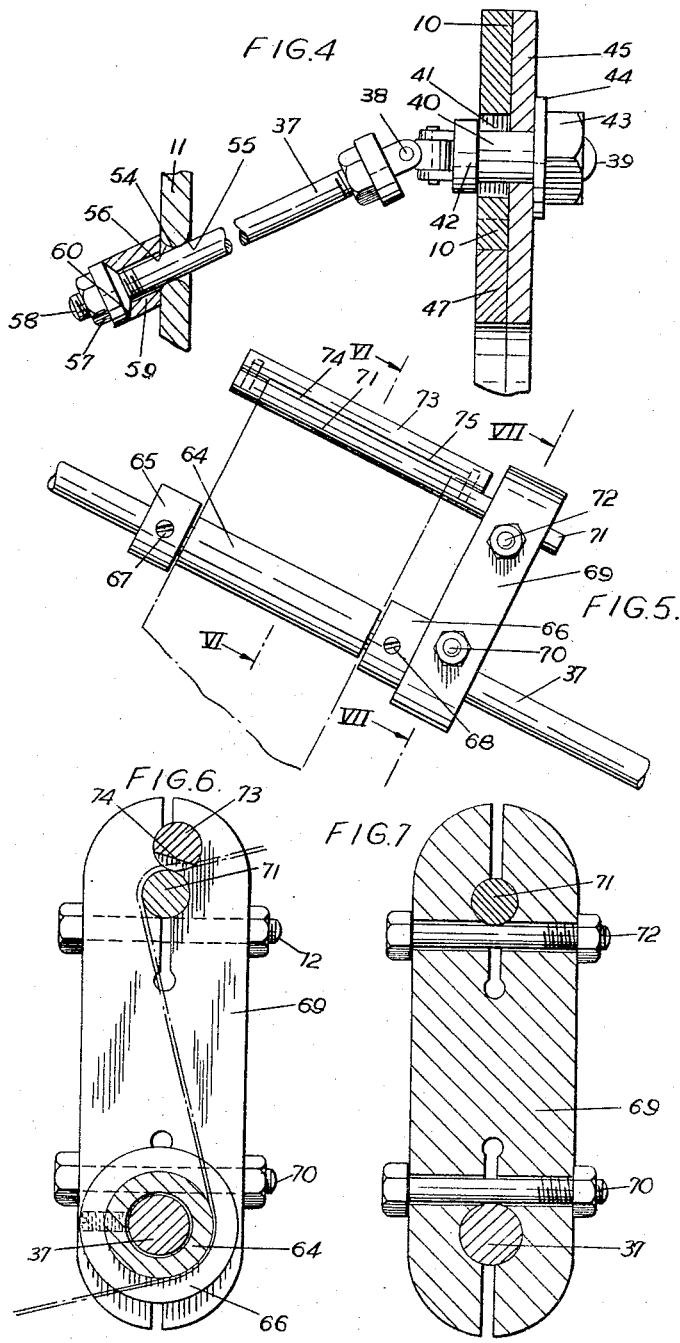
Inventor
Alfred Ansell Hodge
By
Ward, Crosby & Neal
Attorneys

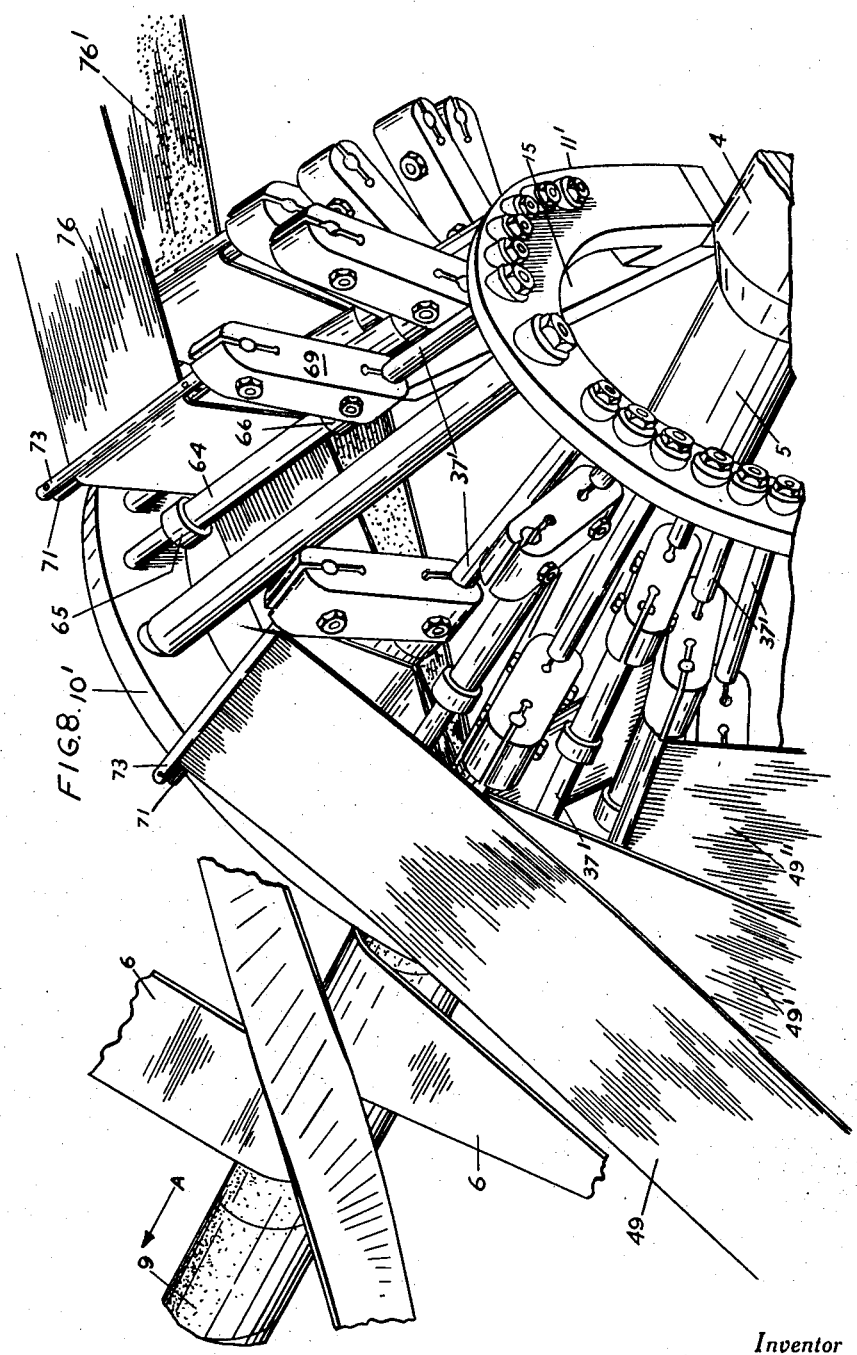

Patented July 3, 1951

2,558,849

UNITED STATES PATENT OFFICE 2,558,849

APPARATUS FOR USE IN THE MANUFACTURE OF LAMINATED TUBES, TUBULAR INSULATIONS, TUBULAR BUSHINGS, AND LIKE TUBULAR MEMBERS FROM FLEXIBLE STRIP MATERIAL

Alfred A. Hodge, Maidstone, England, assignor to Holoplast Limited, New Hythe, near Maidstone, England, a British company Application January 24, 1949, Serial No. 72,446
In Great Britain January 23, 1948

15 Claims. (Cl. 93—80)

(Granted under the provisions of sec. 14, act of March 2, 1927; 357 O. G. 5)

This invention concerns new or improved apparatus for use in the manufacture of laminated tubes, tubular electrical insulations, and like tubular members (all hereinafter referred to as "tubes") from flexible strip material, and the invention has particular reference to the production of laminated tubes from a plurality of flexible strips wound helically one upon another so that the superposed strips break-joint. Helically wound tubes of this character will hereinafter be referred to as "laminated tubes of the kind specified."

In making laminated tubes of the kind specified the several strips of flexible paper are wound about a mandrel which may either be a fixed part of the tube-winding machine when the arrangement will be such that the tube will be fed axially along the mandrel as it is wound, or the mandrel may comprise an electric conductor or cable, copper rod, or the like fed axially through the machine as the tube is formed thereon. However, although applicable to the winding of the tubes (for example, as electrical insulations) upon travelling mandrels (e. g. electrical conductors), the invention is more especially concerned with the manufacture of laminated tubes of the kind specified upon tube winding machines of the character in which the several flexible strips are drawn from reels arranged at stationary spaced locations about a fixed mandrel of the winding machine, the strips being wound upon the mandrel and fed axially therealong by means of an endless cross belt wrapped helically around the mandrel.

Many difficulties have hitherto been experienced in winding laminated tubes of the kind specified, especially where a relatively high number, say twelve, successive layers are required. One difficulty which was experienced in making these laminated tubes was to arrange for the successive strips to be so presented to the mandrel as to effect an accurate butt joint between the edges of adjacent convolutions of each wound strip and to avoid the overlapping or spacing of these edges. Another trouble experienced was the frequent breaking of the strips and the consequent necessity to use strips of relatively high tensile strength thereby precluding the formation of tubes from very thin strips. Because of these and other difficulties the setting up of the tube winding machines ready to make tubes was hitherto slow and required the use of skilled labour. Moreover it was found necessary to keep the machines under constant and vigilant supervision whilst operating. All this kept the production costs of the tubes made upon the machines relatively high.

Although the present invention may be employed in making tubes for a variety of purposes it is particularly suitable for making laminated tubes for use in the production of hollow or cellular structural panels or units such as are described in British Patent No. 546,089, the tubes, initially being produced in cylindrical form and then being deformed to a rectangular, trapezium or H-shaped cross-section so as to be suitable for disposal in side-by-side relationship between spaced groups of laminae adapted to form the top and bottom sheets of the structural panel or unit, and the whole being subsequently integrally united together by the application of heat, and also of top and bottom and side pressure, to the assembly.

When the laminated tubes are to be used for making a structural panel as above described it is highly desirable to avoid the spacing or overlapping of the edges of adjacent convolutions of each of the wound strips from which the tube is formed as otherwise markings corresponding to these overlappings or gaps resulting from the said spacings may be produced in the surface of the finished panel, and although this does not matter in many cases, it is nevertheless desirable to avoid such markings especially where the panel is to be used in a visible decorative manner, such as in furniture, wall panelling, partitions and the like.

Thus objects of the present invention are to provide means whereby laminated tubes of the kind specified may be manufactured more easily and/or with greater precision.

According to the invention there is provided in or for a machine for winding laminated tubes of the kind specified, a winding head comprising a series of guides each adapted to guide in its passage to the mandrel of the tube winding machine one of the strips to be wound on to the latter, and means for supporting said guides around and adjacent to the said mandrel in such oblique positions relatively to the latter that the guides present their respective strips to the mandrel with their edges disposed obliquely to the axis of the latter in order to ensure the helical winding of the strips upon the mandrel.

Each of said guides may comprise a rod or roller partially around which the corresponding strip passes on its way from its reel to the mandrel, the axis of said rod or roller being arranged obliquely with respect to the mandrel axis at the requisite angle to produce the helical winding of the strip upon the mandrel. Conveniently the said guides each comprise an individual guide roller mounted coaxially upon a carrier rod, there being one such rod for each guide roller and collars preferably being provided at the ends of each roller to retain the strip thereon, but if desired the carrier rod itself could be the guide, the strip being adapted to pass partially around this rod between a pair of axially spaced collars thereon.

According to a further feature of the invention the said guides are each capable of independent relative adjustment in a direction transverse to that in which the strip moves in its passage from the guide to the mandrel, this adjustment being furnished to enable the guides to be set at progressively spaced positions along the winding head and with respect to the mandrel to effect a lateral adjustment of the strips passing thereover and to provide for the successively wound strips being presented to the mandrel at appropriately increased angles to take account of the increasing diameter of the tube being wound. Thus, for example, where the guide comprises a roller, this roller (with its collars) may be adapted for adjustment with relation to the mandrel in the direction of the axis of the roller. Alternatively where the guide is formed by the carrier rod, the lateral adjustment of the strip with respect to the winding head and mandrel may be effected by adjusting the said axially spaced collars along such rod.

The winding head according to the invention may thus conveniently comprise two frames of circular or part-circular form which are arranged or adapted to be arranged concentrically with the mandrel of the winding machine so as preferably to extend around the upper side thereof, the front frame (that is the frame nearer to the end of the machine from which the wound tube is discharged and which end of the machine is herein regarded as the "front end") being of a larger radius than the other or rear frame and being spaced along the mandrel from this other frame, and the said frames having a number of the said carrier rods extending between them in such a way as to converge to the rear end of the frame and thus towards the mandrel. Conveniently twelve of these carrier rods may be provided but more or less of such rods may be used as desired, and these carrier rods may be arranged in two groups disposed on either side of a vertical plane passing through the axis of the mandrel.

According to a still further feature of the invention the winding head may be furnished with tensioning devices for tensioning the said strips between the said guides and the mandrel. These tensioning devices may be, and preferably are, adjustable with the said guides laterally of the corresponding strips and conveniently they are carried by the said carrier rods for adjustment along these rods correspondingly to the said guide rollers and the said axially spaced collars.

Each of the said tensioning devices may comprise a forked or slotted element over and through which the strip is adapted to pass sinuously, e. g. in S-fashion. Moreover each forked or slotted element may be carried by an arm mounted on the associated carrier rod and be arranged so that the length of its slot is parallel with the axis of such rod. Furthermore, the forked or slotted element may be adapted for adjustment about the axis of the said carrier rod and preferably also angularly about its own axis.

In a convenient setting of the winding head the said strips are arranged to pass around their respective guide rods or rollers with their longitudinal edges at right angles to the axes of these rods or rollers and with the axes of the latter arranged at an acute angle to the axis of the mandrel; consequently the strips are presented to the mandrel at the complementary acute angle.

Where the quality of the manufactured tubes need not be of a high order of perfection, e. g. where it is immaterial whether there is or is not some slight occasional overlap or spacing of the adjoining edges of adjacent convolutions of a wound strip, the said carrier rods may be unadjustably fixed in the winding head instead of being adjustable as above described. However it will be obvious that with such an arrangement an approximate or mean setting of the carrier rods will have to be chosen and that this setting will not be ideal in all circumstances, for example, for all diameters of the tube formed on the machine or all widths of strip used in making tubes, because of the changing angle at which the successive strips require to be fed to the tube as its thickness increases or where different strip widths are used.

According to a further feature of the invention it is preferred, especially when tubes of a high quality are to be produced, to arrange the said guides, or better still—those portions of the surfaces of the guides where the flexible strips leave these guides and pass to the mandrel—each in a plane tangential or substantially tangential to the surface on to which the strip is to be wound, i. e. the surface of the mandrel in the case of the first or inner strip, the outer surface of the tube formed by the first strip wound on to the mandrel in the case of the second strip, and so on.

According to a further feature of the invention the guides are mounted so as to be independently adjustable to vary their angles of obliquity to the mandrel. This adjustment provides for the setting of the guide for each strip appropriately for that strip in accordance with whether it is the first or last strip to be wound onto the mandrel or an intermediate strip.

According to a further feature of the invention the guides are also independently adjustable to enable them to be adjusted into the tangential arrangement previously described where the diameter of the tube to be produced is changed or other circumstances arise which require a change in the setting of these guides.

When one or more of the guides is or are adjusted endwise with a respect to the mandrel to take care, for example, of the increasing diameter of the tube being formed and the consequent necessity for the subsequently applied strips to be presented to the mandrel at greater angles to the preceding strip or strips, a somewhat slack edge may be produced in the strips fed over these adjusted guides if the angles at which the adjusted guides are disposed with respect to the mandrel remain unchanged. Therefore the said adjustability of the obliquity of the guides and of their tangentiality with respect to the mandrel are desirable and may be effected by making the said carrier rods adjustable in the winding head relatively to the mandrel and where the guides comprise rollers on the carrier rods this adjustment of the carrier rods would also effect the adjustment of these rollers. Thus the carrier rods will conveniently each be adjustable to and from the mandrel at one end along a path, e. g. in a slot, parallel to a plane substantially tangential to the surface on to which the strip to be passed over the rod is to be wound whilst at the other end the rods may all be adjustable around the mandrel along a common pitch circle. These adjustments of the rods could be manually effected separately for each rod or mechanical means could be provided for adjusting the rods simultaneously at one or at each end.

Thus the guides are adjustable in a variety of ways, these various adjustments enabling the guides to be so arranged with respect to the mandrel that each strip contributing to the making of the laminated tube can be accurately fed to the mandrel to ensure the close butt jointing of the adjacent convolutions of each helically coiled strip and the pre-setting and maintenance of the required break-joint-overlap of the superposed coiled strips, these various adjustments being capable of modification to suit variations in mandrel sizes, tube diameters and thicknesses, and strip widths and thicknesses.

The provision of individual guides and independently variable tensioning means near the mandrel for the several strips used in the making of a tube enables tubes to be made satisfactorily on a commercial scale from thinner strips than has hitherto been customary, e. g. strips of paper of 0.006 inch thick, whereas usually paper strips of 0.015 inch or more thick have been used. The production of these tubes is also assisted by the provision of the various adjustments of the guides above referred to.

Although the mandrel is preferably of cylindrical form it could, if desired, be of a non-circular cross-sectional form, such as, for example, regular polygonal form as hexagonal.

Also it should be remembered that in some cases the mandrel may be constituted by a cable or rod travelling axially at the same rate as the finished tube instead of being a fixed mandrel.

Further features of the invention will become apparent from the following description of certain embodiments of the invention and the appended claims.

In order that the nature of the invention may be more readily understood and carried into practice two embodiments of the same will now be described by way of example with reference to the accompanying drawings in which:

Figure 1 is a perspective view of a portion of a tube winding machine of known kind having a winding head constructed in accordance with this invention applied thereto;

Figure 2 is a front end elevation of the winding head shown in Figure 1;

Figure 3 is a part elevation and part section on line III—III, Figure 2;

Figure 4 is a part sectional detail view of the winding head showing in particular one of the carrier rods thereof;

Figure 5 is a side elevation showing in detail one of the guide rollers and tensioning devices of the winding head illustrated in Figures 1 to 3;

Figure 6 is a section on line VI—VI, Figure 5, drawn to an enlarged scale;

Figure 7 is a section on line VII—VII, Figure 5, also drawn to an enlarged scale; and Figure 8 is a perspective view of a modified form of winding head according to this invention of a somewhat simpler construction than that shown in Figures 1 to 3 of the drawings.

Referring to Figure 1 of the drawings it will be seen that the winding head constructed in accordance with this invention is generally designated by the reference 1 and that this figure of the drawings shows this winding head applied to a tube winding machine generally designated by the reference 2.

The tube winding machine shown is of known kind and will not be described in detail herein, but, in-so-far as it is necessary to refer to certain parts of the winding machine, these parts will be identified as far as is essential by specific reference thereto. Thus the tube winding machine comprises a stationary head 3 in which is fixed the enlarged end 4 of a stationary mandrel 5 of cylindrical rod form, and an endless cross belt 6 formed of rubber or other suitable flexible material which will give an appropriate friction grip upon the tube being made, this belt 6 passing around a pair of pulleys 7 and 8 arranged on opposite sides of the mandrel 5 and at least one of which is driven in any appropriate manner so as to cause the belt 6 to traverse across the mandrel. The belt 6 is wrapped helically around the mandrel 5 as shown and by its construction and arrangement it is adapted in the well known manner to rotate a tube, such as the tube 9, formed on the mandrel around the latter and to feed this tube axially along the mandrel in the direction of the arrow A.

As previously stated, the end of the tube winding machine at which the tube leaves the machine is herein referred to as the "front end" of the machine. Thus looking at Figure 1 the end of the machine at which the pulleys 7 and 8 are disposed is the front end of the machine.

The winding head according to the embodiment of this invention shown in Figures 1 to 3 comprises a pair of end frames 10 and 11, the front frame 10 being of semi-circular shape and the rear frame 11 being in the form of a flat annular plate or ring. These two frames are arranged parallel to one another and in use are spaced apart axially along the mandrel, the frames being arranged concentrically with respect to the mandrel and in planes perpendicular to the axis of the latter. The front frame 10 thus has its centre of curvature at the centre of the mandrel and extends substantially half way round the mandrel on the upper side thereof and is secured, at its lower ends, to brackets 12 and 13 respectively secured to base plates 14 and 15 respectively bolted to the tube winding machine 2 below and on opposite sides of the mandrel. The base plates 14 and 15 also carry a bracket 16 secured to a collar 17 (see Figure 3) fixed by a set screw 18 coaxially upon the enlarged end 4 of the mandrel 5.

The collar 17 carries four equi-angularly spaced horizontal forwardly projecting rigid posts 19 arranged around the head 4 of the mandrel on a common pitch circle concentric with the mandrel, and upon the front ends of the posts 19 is fixed a bearing ring 20 furnished with a peripheral groove 21 in which the inner marginal portion 22 of a generally circular annular plate or ring constituting the end frame 11 is mounted so that this frame can be oscillated about the axis of the mandrel 5, oscillation of the frame 11 being effected through a worm 23 fixed upon a rotatable shaft 24 furnished with an operating handle 25 and mounted in brackets 26 on the base plates 14 and 15, the said worm meshing with worm teeth 27 on the lower part of the frame 11.

The frames 10 and 11 are rigidly held at the required distance apart by the base plates 14 and 15 and a releasable tie rod 28 extending between the frames at the upper parts thereof.

The frame 10 has a greater radius than the frame 11 Thus for example, where the mandrel is of between 0.913 and 2.25 inches in diameter, the radius of the frame 11 to the centre of the tie rod 28 is conveniently 4.5 inches, whilst the similar radius of the frame 10 is conveniently 11.5 inches. Thus the tie rod 28 inclines downwardly and rearwardly with respect to the mandrel 5 over which it is directly located. Where the mandrel is of 0.913 inch in diameter, the strip used for winding the tubes is preferably 1.25 inches wide.

The ends of the tie rod 28 are secured to the frames 10 and 11 through the medium of nuts 29, 30, 31 and 32 on the ends of the rod which are suitably screw-threaded, appropriate bushes or washers 33, 34, 35 and 36 being provided in pairs between the said pairs of nuts 29 and 30 and 31 and 32 for respectively clamping the frames 11 and 10 therebetween, said bushes having oblique end surfaces to engage the frames 10 and 11 and accommodate the inclination of the tie rod with respect to the frames.

In addition to tying the frames 10 and 11 together the tie rod 28 serves, by tightening up the nut 30 and/or the nut 29, to lock the frame 11 against angular adjustment about the mandrel 5 as hereinafter described.

A series of carrier rods 37 are also arranged between the frames 10 and 11 by which they are supported, these rods extending between these frames obliquely with respect to the axis of the mandrel 5 of the tube winding machine and so as to converge towards the rear end of the winding head. All the carrier rods 37 are similar in form and are each adjustably mounted at their front ends in the frame 10 and are adjustable at their rear ends about the mandrel 5 with the frame 11.

Thus, as will be clearly seen from the detailed Figure 4, at its outer and front end, each rod 37 is furnished with a universal joint 38 which is connected to a screw-threaded stud 39 having a plain shank 40 adjustably mounted in a slot 41 (Figures 2 and 4) in the front frame 10, this shank being furnished with a collar 42 adapted to engage the rear side of the frame 10 and the stud 39 having a nut 43 and a washer 44 by which the stud can be secured in any of its adjusted positions in the slot 41. The washer 44 is adapted to engage against the front surface of an arcuate cam plate 45 mounted on the front surface of the frame 10 and which cam plate is of a semi-circular shape approximately corresponding in size and form to the frame 10 so as to lie against the latter. The cam plate 45 is also provided with a slot for each of the studs 39, these slots being clearly seen in Figures 1 and 2 and being marked 46.

The cam plate 45 is located with respect to the frame 10 by a semi-circular bead 47 fixed to or formed on its rear surface so as to ride around the inner periphery of the frame 10 and by the outer front end of the tie rod 28 and its washer 35 which pass through an arcuate slot 48 formed in the upper part of the arcuate cam plate 45 and which permits of adequate rotational or angular adjustment of the plate 45 being effected about the axis of the mandrel 5 without interference from the tie rod. The cam plate is locked in any of its adjusted positions by means of the nuts 43 on the studs 39 or separate locking means may be provided for the cam plate.

Upon each of the carrier rods 37 is mounted a guide roller 64. Each of these rollers comprises, as will be clearly seen from Figures 5 and 6 of the drawings, a sleeve coaxial with and rotatable upon its carrier rod 37. The drawings illustrate these rollers and parts associated therewith as applied to only some of the carrier rods 37 but the omission of some of the rollers from the drawings is only to simplify the illustration of the apparatus and each carrier rod will be furnished with a guide roller and tension means as will be described. However, it should be understood that if for any particular operation only some of the guide rollers are required for use, the other guide rollers with their carrier rods and tensioning devices may, if desired, be removed from the winding head.

The guide rollers 64 are independently axially adjustable along their carrier rods 37 so that they can be set in such progressively spaced positions around the mandrel 5 as is required to provide for the helical winding of the strips and the break-jointing between successively wound strips.

Each roller 64 is located upon its carrier rod between a pair of rollers 65 and 66 which are secured on the carrier rods 37 in an axially adjustable manner by grub screws 67 and 68 respectively. The collars 65 and 66 are of larger external diameter than the roller 64 so as to form flanges or shoulders at the ends of the roller to act as guides for the edges of the flexible strip, such as, for example, the strip 49, to be passed over the roller. As the roller is free to revolve upon its carrier rod less friction is produced than would be the case if the flexible strip were to pass directly over the rod 37 although this arrangement could, as already stated, be followed if desired, the rollers 64 then being omitted and the strip being merely guided by the rod between the collars 65 and 66.

A tensioning device is provided for each flexible strip to be fed to the mandrel and this tensioning device is conveniently carried by the carrier rod 37 on which is mounted the roller 64 over which the strip is adapted to be guided. This tensioning device is also adapted for adjustment along its carrier rod in accordance with the axial adjustment of the roller 64. Conveniently each tensioning device comprises a supporting arm 69 drilled and slotted at its opposite ends so as to be capable of being adjustably clamped at one end by a bolt or equivalent device 70 upon the carrier rod 37 at right angles to the axis of this rod and in any angularly arranged position about the rod, whilst the other end of the arm can have clamped therein one end of a slotted tensioning element.

This tensioning element conveniently comprises a primary rod 71 of circular cross-sectional form having one end clamped in the free end of the arm 69 by a bolt 72 or equivalent member. Thus the primary rod 71 is angularly adjustable about its own axis in the arm 69.

The rod 71 is disposed so as to be perpendicular to the arm 69 and thus parallel to the axis of the corresponding guide roller 64 and its carrier rod 37, and upon the primary rod 71 is riveted, or otherwise suitably secured, a similar but shorter secondary rod 73 so that the tensioning element formed from these combined rods is of approximately figure eight shape in cross-section.

One of the two rods 71 and 73, and preferably the rod 73, is, as shown in the drawings, furnished on the side adjacent the other rod with a flat 74, the maximum depth of which will normally be approximately .040 of an inch from the periphery of the rod although this dimension will be chosen to suit the thickness of the flexible strips to be used in the machine and, where necessary, to allow for joints in the strip passing through the slot. The said flat 74 thus produces, between the two rods 71 and 73, an eccentric elongated slot 75 forming a guide through which the flexible strip to be wound may be passed as indicated in dotted lines in Figure 6, an appropriate tension being applied to the strip by adjusting the slotted element composed of the rods 71 and 73 about the axis of the primary rod 71 in the arm 69 in order to give the strip a sharper or less sharp S-bend. Moreover, the arm 69 can be adjusted about the rod 37 so that the strip controlled thereby encircles the corresponding roller 64 to a greater or lesser degree as will be clearly understood from the drawings.

The primary rod 71 can be secured in its adjusted position by the bolt 72 when the required amount of twist has been put upon the strip and the correct tension obtained, and similarly the arm 69 can be locked upon the rod 37 after adjustment of the tension in the part of the flexible strip between the mandrel 5 and the corresponding tensioning device. Thus the tensioning of the parts of the flexible strips between the mandrel and their guide rollers can be effected independently of the reels from which the strips are fed and without the necessity of adjustment (as hitherto) as these feed reels decrease in diameter.

Preferably the carrier rods 37 are arranged in two groups, one group being disposed on either side of the vertical plane passing through the axis of the mandrel 5 and the axis of the tie rod 28, and the carrier rods in each group are conveniently equally or approximately equally spaced from one another, the arrangement being such that the guide rollers 64 on the carrier rods 37 on the one side of the mandrel 5, i. e. the right-hand side as seen in Figure 2, deal with the flexible strips that are to pass over the mandrel 5, whilst the other group of carrier rods and rollers 64 deal with the strips that are to pass under the mandrel.

The slots 41 (hereinafter referred to as the tangential slots) in the front frame 10 for the carrier studs 39 are so arranged that each of the strips to be wound, for example the strip 49, fed from a guide roller 64 on a carrier rod 37, will be positioned substantially tangential to the mandrel or the cylindrical surface on to which it is being wound for the whole distance between the mandrel 5 and its guide roller 64 and throughout its entire width.

Thus, as will be seen from Figure 2 of the drawings, the centre line 50 of each of the slots 41 is approximately parallel to the tangential path assumed by the strip passing to the mandrel from the guide roller on the carrier rod associated with the slot and thus the longitudinal centre lines of the slots 41 will, if inwardly extended, intersect radial lines from the mandrel centre at spaced points on a spiral curve which increases in the direction of winding.

The adjustment of the studs 39, and consequently the outer ends of the carrier rods 37, inwardly or outwardly with respect to the mandrel 5 is effected by rotating the cam plate 45 upon the front frame 10, the slots 46 in this cam plate being arranged transversely of the tangential slots 41 in the front frame 10 as shown, for example, in Figure 2. Thus clockwise adjustment (looking at Figure 2) of the cam plate 45 with respect to the frame 10 will cause the studs 39 to move inwardly in their slots, whilst an adjustment of the plate 45 in an anti-clockwise direction will cause these studs to move outwardly in their slots always assuming that the nuts 43 have been released.

The angular adjustment of the cam plate 45 is facilitated by the provision on this plate of an operating knob 52 adapted for manual operation, but if desired mechanical means, such as a rack and pinion or worm or a screw and nut adjustment could be provided for moving the cam plate 45.

The inner ends of the carrier rods 37 are adapted for swivelling or ball joint type of movement with respect to the frame 11 in which they are mounted to accommodate the angular adjustments of the rods and for this purpose the rods pass through holes 54 in the frame 11 which are flared outwardly at their front and rear ends 55 and 56, the carrier rods being secured to the frame after adjustment by means of nuts 57 on their outer screw-threaded ends 58, these nuts bearing against a collar or washer 59 and the nuts and washers having, if desired, mating spherical seating surfaces 60. Desirably the washers 59 are a loose fit upon the carrier rods 37 and have oblique end surfaces abutting the rear surface of the frame 11.

Thus by releasing the nuts 57 the carrier rods 37 are free to oscillate with respect to the frame 11 when the studs 40 at the other ends of the carrier rods are adjusted in the tangential slots 41 or when the frame 11 is adjusted about the axis of the mandrel 5.

The adjustment of the rear ends of the carrier rods 37 about the mandrel 5 is provided to enable these ends of the rods, and consequently the whole lengths of the rods, to be brought into such co-relation with the front ends of the carrier rods that the mandrel-end-portions of the flexible strips passing over the guide rollers on the several carrier rods will have their whole widths disposed in the tangential planes hereinbefore referred to. This adjustment of the rear ends of the rods 37 is also particularly required when the mandrel size (diameter) is changed or where a change is made in the thickness and/or widths of the strips employed or the thickness of the tube to be produced. This adjustment of the frame 11 about the mandrel 5 is effected as hereinbefore described through the medium of the worm 23 and rack 27, the frame 11 being furnished with an arcuate slot 61 through which passes the tie rod 28, the slot 61 permitting the required angular movement of the frame 11 relative to the tie rod 28 after the nuts 29 and/or 30 on this tie rod have been released.

The angular adjustment required for the frame 11 will not ordinarily exceed 5° to each side of the central point and the central position may be indicated by a graduation 62 on the fixed ring 20 and appropriate graduations 63 may be provided on the frame 11 to co-operate with the index mark 62. The locking of the frame 11 in its adjusted position may be effected by re-tightening the nuts 29 and/or 30 on the tie rod.

The drawings illustrate the making of a laminated tube of the kind specified from five flexible strips 49, 49', 49'', 76 and 76', the strips 49, 49' and 49'' being fed to the upper side of the mandrel and the strips 76 and 76' being fed to the underside of the mandrel. The several flexible strips employed for making the tube may all be of the same width or may be progressively wider in series outwardly from the inner surface of the tube so as to take care of the increase in diameters of the successive layers of the tube in order to maintain the desired predetermined co-relation of the butt joints of adjacent turns of the successively wound strips and maintain the desired break-joint arrangement throughout the thickness of the tube. However, by providing the adjustments hereinbefore described for the carrier rods 37 and their rollers 64 it is possible to wind the tube satisfactorily using the same width of strip for every layer of the tube.

The flexible strips used for making the tube are drawn on to the mandrel by the belt 6 (via the guide rollers 64 and the associated tensioning devices) from reels arranged on horizontal shafts carried in skeleton frames located on the floor around the winding machine, this apparatus not being shown in the drawings as it forms no part of this invention. Preferably the reel shafts would be arranged approximately at right angles to the angle at which their respective strips are to be fed to the mandrel but the final guiding and directing of the strips is effected by the hereinbefore described tensioning devices and the associated guide rollers 64 which are set to give an accurate lead in for the strip to the mandrel at a position quite close to the mandrel as is obvious from the drawings. As there is only a relatively short distance between the guide rollers 64 and the mandrel 5 there is little opportunity for error in the feeding of the strip between these two parts and therefore a high degree of accuracy is maintained.

The said frames carrying the reels may have adhesive applying means (e. g. one or more tanks and rollers) for the strips where required.

The flexible strip material will usually be of a fibrous character such as paper (e. g. kraft paper), textile material, wood veneer, woven spun glass, or the like, but nevertheless it should be understood that the invention may be applied to the formation of tubes from other strip materials which may be of a non-fibrous character. Where the strip is paper it is preferred to have the main fibres running in the direction of the length of the strip.

The strip from which the laminated tubes are made may carry or have applied thereto an adhesive which may be of such a character as to serve to unite the various superposed strips to one another immediately the winding of the strips is effected or which may alternatively be of a form such as to require a further operation to effect the adhesion or union together of the various parts of the laminated tube. For instance, where the strips are of a fibrous nature, the adhesive may be a heat hardening synthetic resin, for example a phenol-formaldehyde resin, with which the strips have been treated (e. g. impregnated) and which requires a subsequent application of heat to cause the resin to flow and also the application of pressure to consolidate the laminated tube and cause its several parts to be integrally united together and the final hardening of the resin. Such a form of impregnated strip would preferably be used where they were intended for use in making panels according to Patent No. 546,089 hereinbefore referred to. If desired, adhesives of both the above mentioned forms may be employed, a tacky adhesive being applied to one or more of the strips to hold the tube temporarily but flexibly in its formed condition until the necessary heat and pressure is applied to cure the resin and finally consolidate the tube in the required cross-sectional form.

A tube winding machine having a winding head constructed as above described is used in a manner similar to that well known in connection with this type of machine but in this case before passing the flexible strips 49, 49', 49'', 76 and 76' around the mandrel and to the belt 6, each strip is threaded through the slot 75 of its tensioning element and laid around its guide roller 64. In addition the guide roller 64 for each of the strips is independently adjusted along its guide rod 37 to the proper position for laying the strip at the correct angle upon the mandrel so that the strip is wound up helically correctly with the edges of successive turns making a close butt joint with one another without overlap or spacing.

The angles at which the strips have to be presented to the mandrel depend on a variety of factors such as the diameter of the mandrel and the width and/or thickness of the strip employed. However, assuming that the strip used is of the same width for every layer, the angle which the inner edge of each successive strip should make with the axis of the mandrel will be greater than that of the preceding strip, this angle increasing as the diameter of the tube increases. Thus as the strips should leave their respective rollers with their edges at right angles to the axes of these rollers, it follows that if slack, an edge is not to be present along at least one edge of each strip between the roller 64 and the mandrel 5, not only should each roller be adjusted axially along its carrier rod but the angular relation of the roller axis to the mandrel axis must also be adjusted. This is provided for by adjusting the carrier rods in their supporting structure relative to the mandrel. Thus the front ends of the carrier rods 37 are adjusted relatively to the mandrel in the tangential slots 41 in the front frame 10. Furthermore the positions of the carrier rods are, if necessary, further adjusted by rotating the frame 11 of the winding head so that as a result of these adjustments the guide rollers 64 are brought into such positions that the longitudinal portions of their surfaces at which the strips 49'', 49', 49, 76 and 76' leave the rollers and pass to the mandrel are, throughout their lengths, in planes substantially tangential to the cylindrical surface on to which the strips leaving the rollers are respectively to be wound. Thus the various rollers 64 are so adjusted that in the case of the strip 49'', which is the inner strip of the tube to be formed, the lowermost portion of the peripheral surface of the roller 64 over which this strip passes is throughout its length substantially tangential to the upper part of the periphery of the mandrel 5, whilst the lower part of the roller 64 over which the strip 49' passes is in a plane substantially tangential to the cylindrical surface of the first layer of the tube formed by the strip 49''; the lowermost part of the periphery of the guide roller 64 over which the strip 49 passes is in a plane substantially tangential to the outer cylindrical surface of the second layer of the tube formed by the strip 49'; the strip 76 is similarly presented throughout its width tangentially to the layer of the tube formed by the strip 49; and the strip 76' is presented tangentially to the cylindrical surface of the fourth layer of the tube formed by the strip 76. Thus the whole of the portions of the strips between their guide rollers 64 and the cylindrical surface on to which they are wound are each arranged and maintained in a plane tangential to this last mentioned cylindrical surface throughout the whole width of the strip and therefore this portion of the strip is maintained with relatively taut edges on either side.

Approximately speaking, when the mandrel 5 is of 1⅝" diameter, then with the inner strip 49" of two inches wide, this strip will be presented to the mandrel at an acute angle of approximately 64° and since the strip is arranged to leave its guide roller 64 at right angles to the axis of this roller, the corresponding carrier rod 37 will be arranged at the complementary angle of approximately 26° to the axis of the mandrel 5. As previously stated the angles of incidence at which the strips 49', 49, 76 and 76' will be presented to the mandrel 5 are greater acute angles than that of the strip 49", consequently the various carrier rods require to be adjusted independently of one another to the required angular setting with respect to the mandrel 5 and to give the desired tangentiality as hereinbefore described. When these adjustments have been effected the inner ends of the carrier rods 37 will lie upon a common pitch circle around the mandrel 5, whilst the outer ends of the rods will lie upon a gradual spiral curve expanding outwardly from left to right as the rods are seen in Figure 2 and as will be obvious from this figure, so that the carrier rod over which the inner or first strip 49" passes is at a greater acute angle to the axis of the mandrel than the other rods, the rod over which the outer or last strip 76' passes being at the smallest angle to the mandrel.

The collars 65 and 66 at the ends of the rollers 64 act as flank guides for the edges of the strips and in setting up the apparatus these collars are adjusted with their rollers 64 and also the tensioning devices are adjusted as previously explained to give an appropriate degree of tension to the strips between their guide rollers and the mandrel whereby these portions of the strips are maintained under sufficient tension (but insufficient tension to cause fractures in the strips) irrespective of the tension in the strips between their reels and the said tensioning devices. It will, of course, be appreciated that the tension applied will depend upon the thickness and/or tensile strength of the strip being employed.

The winding head, or a part of the winding machine adjacent the winding head, may carry a lubricating or waxing pad on to which the strip of paper first to be wound on to the mandrel may be resiliently pressed to lubricate or wax the surface of such strip which will lie directly upon the mandrel as the tube is wound, thereby reducing the friction between the tube and the mandrel and facilitating the rotation of the tube on and its feeding along, the mandrel. If the flexible strips are impregnated with uncured phenol-formaldehyde resin as hereinafter proposed, the said lubricant may be stearine as this will not be harmful to the resin and will prevent the mandrel and tube overheating and the premature partial curing of the resin.

By arranging for the flexible strips to be fed to the mandrel as above described the correct angle and lay and tensioning of the strips may be obtained and, once set up, can be retained. Thus the danger of slack edges occurring in the strip is eliminated or reduced, the wandering of the strip avoided and accurate abutment of the adjacent edges of successive convolutions of each layer of the laminated tube is achieved with consequent regularity in the wall thickness of the tube produced. Furthermore the maintenance of a substantially constant break-joint relation between successive layers of the tube is achieved.

The rigid feed control for the strips provided by the arrangements above described thus ensures that the machine will require in operation less attention than machines hitherto employed, whilst at the same time enabling the machine to operate if desired at a higher speed with fewer breakages or with thinner strips than has hitherto been ordinarily commercially possible.

Moreover, by the use of the winding head above described, it becomes possible to employ the more convenient arangement in which the reels for the strips have their axes in horizontal planes and also to arrange the reels in compact arrangement so that an economy in floor space may be achieved.

In Figure 8 of the drawings a simpler form of the winding head is illustrated, this head being much the same as that hereinbefore described with the exception that both of the frames 10' and 11' may be fixed relative to the winding machine and each of the carrier rods 37' may be fixed in the front and rear frames 10' and 11' so as to present its particular flexible strip to the mandrel at substantially the correct angle with no provision for adjusting the obliquity of the carrier rods with respect to the mandrel, these carrier rods being arranged with their axes in planes approximately tangential to the surface of the mandrel 5 or in planes parallel to these tangential planes or even in planes radial to the mandrel if desired.

The various parts of the winding head shown in Figure 8 corresponding to those illustrated in Figures 1 to 7 are marked with the same reference numerals.

With this simpler form of winding head it is preferred to use strips of progressively increasing width for forming the tube, the strip furnishing the first layer of the tube being the narrowest. Very good results can be obtained with this simplified form of winding head but where greater accuracy and tubes of higher grade finish are required, it is preferred to use a winding head as described with reference to Figures 1 to 7 which is capable of use with still less supervision than the winding head shown in Figure 8 itself a great improvement on existing arrangements.

I claim:

1. In a machine for winding flexible strips about a mandrel to produce laminated tubes of the kind specified, a winding head for controlling the feeding of the flexible strips to the mandrel and comprising, a supporting structure stationarily mounted on the winding machine adjacent the mandrel thereof; a series of guide rollers carried by said supporting structure and each adapted to have one of the said strips passed partially therearound and to guide the strip to the mandrel; such guide rollers being arranged relatively to one another in angularly spaced positions arch-wise around said mandrel with the axes of the guide rollers converging to different extents from the front end towards the rear end of the winding head so as each to be obliquely disposed with respect to the mandrel and thereby to present their respective strips obliquely to the mandrel at different angles to effect the helical winding of the strips about the mandrel and to take into account the increasing diameter of the tube formed as successive strips are wound one upon another; said guide rollers also being arranged in said supporting structure at relatively spaced positions along the mandrel to provide for the feeding of successive strips to the mandrel in laterally offset positions to achieve the break jointing of successive layers of the wound strip; and means for tensioning the portions of the said flexible strips lying between said guide rollers and the said mandrel and such tensioning means comprising a slotted strip tensioning element for each of said guide rollers and through which passes the strip fed to such roller, such slotted tensioning elements each being arranged parallel to its roller but adjustable about the axis of the latter.

2. Apparatus according to claim 1, wherein the said guide rollers are adjustable independently in the directions of their axes.

3. Apparatus according to claim 2, wherein the said guide rollers are adjustable transversely of their axes relatively to the mandrel.

4. Apparatus according to claim 3, wherein the opposite ends of said guide rollers are adjustable transversely of the axes of the guides and along different paths.

5. In a machine for winding flexible strips about a mandrel to produce laminated tubes of the kind specified, a winding head for controlling the feeding of the flexible strips to the mandrel and comprising, a front and a rear end frame mounted on the winding machine around the mandrel thereof at spaced positions therealong; a series of carrier rods supported in and extending from one of the said end frames to the other end frame, such carrier rods being spaced from the mandrel but arranged relatively to one another in angularly spaced side-by-side positions around such mandrel with their axes converging from the said front end frame to the rear end frame so that they are obliquely disposed with respect to the mandrel; a cylindrical guide roller mounted coaxially on each of said carrier rods for rotation about and for adjustment along such carrier rod whereby the several rollers may be set at relatively spaced positions along the mandrel; means for simultaneously adjusting the said carrier rods at one end transversely of their axes to vary the obliquity of the axes of the guide rollers thereon with respect to the said mandrel; and a pair of end collars for each of said rollers, such collars being arranged one at each end of the roller and being coaxial with, of larger external diameter than, and axially adjustable with, the roller.

6. In a machine for winding flexible strips about a mandrel to produce laminated tubes of the kind specified, a winding head for controlling the feeding of the flexible strips to the mandrel and comprising a front and a rear end frame mounted on the winding machine around the mandrel thereof at spaced positions therealong; a series of carrier rods extending from one of the said end frames to the other end frame, such carrier rods being spaced from the mandrel but arranged relatively to one another in angularly spaced positions around such mandrel with their axes converging from the said front end frame to the rear end frame so that they are obliquely disposed with respect to the mandrel; a cylindrical guide roller mounted coaxially on each of said carrier rods for rotation about and for adjustment along such carrier rod whereby the several rollers may be set at relatively spaced positions along the mandrel; a pair of end collars for each of said rollers, such collars being arranged one at each end of the roller and being coaxial with, of larger external diameter than, and axially adjustable with, the roller; and a strip tensioning device mounted on each of said carrier rods, there being one such device for each of said rollers and each tensioning device being adapted to apply tension to the strip guided by the adjacent guide roller over that port of the strip extending between the said guide roller and the mandrel of the winding machine, each such tensioning device comprising an element having a slot through which the strip to be tensioned is passed, such slotted element being arranged with the length of its slot parallel to the axis of the adjacent guide roller but spaced from such roller, the tensioning element being adjustable about an axis parallel to and closely adjacent to the said slot to vary the tension on the strip passing through the slot, and also being bodily adjustable about the axis of the said adjacent guide roller.

7. In a machine for winding flexible strips about a mandrel to produce laminated tubes of the kind specified, a winding head for controlling the feeding of the flexible strips to the mandrel and comprising, a front and a rear end frame mounted on the winding machine around the mandrel thereof at spaced positions therealong; a series of carrier rods extending from one of the said end frames to the other end frame, such carrier rods being spaced from the said mandrel and supported in the said frames so as to be adjustable transversely of their own axes and with respect to the mandrel, such carrier rods also being arranged relatively to one another in angularly spaced positions around the mandrel with their axes converging from the said front end frame to the rear end frame so that they are obliquely disposed with respect to the mandrel; means for adjusting the opposite ends of the said carrier rods independently, a cylindrical guide roller mounted coaxially on each of said carrier rods for rotation about and for adjustment along such carrier rod whereby the several rollers may be set at relatively spaced positions along the mandrel; a pair of end collars for each of said rollers, such collars being arranged one at each end of the roller and being coaxial with, of larger external diameter than, and axially adjustable with, the roller; and a strip tensioning device mounted on each of said carrier rods, there being one such device for each of said rollers and each tensioning device being adapted to apply tension to the strip guided by the adjacent guide roller over that part of the strip extending between the said guide roller and the mandrel of the winding machine.

8. In a machine for winding flexible strips about a mandrel to produce laminated tubes of the kind specified, a winding head for controlling the feeding of the flexible strips to the mandrel and comprising, a front and a rear end frame mounted on the winding machine around the mandrel thereof at spaced positions therealong; a series of carrier rods extending from one of the said end frames to the other; a cylindrical guide roller mounted coaxially on each of said carrier rods for rotation about and for adjustment along such carrier rod whereby the several rollers may be set at relatively spaced positions along the mandrel; a pair of end collars for each of said rollers, such collars being arranged one at each end of the roller and being coaxial with, of larger external diameter than, and axially adjustable with, the roller; said carrier rods being arranged relatively to one another in angularly spaced positions around the mandrel with their axes converging from the said front end frame to the rear end frame so that they are obliquely disposed with respect to the mandrel, these carrier rods also being spaced from the mandrel and each so disposed that the guide rollers thereon present those portions of their respective strips extending between the guide rollers and the mandrel substantially tangentially to the surface on to which they are to be wound and said carrier rods also being supported in the said frames so as to be adjustable transversely of their lengths at each end; means for adjusting the opposite ends of the said carrier rods independently, and a strip tensioning device mounted on each of said carrier rods, there being one such device for each of said rollers and each tensioning device being adapted to apply tension to the strip guided by the adjacent guide roller over the said part of the strip extending between the said guide roller and the mandrel of the winding machine.

9. In a machine for winding flexible strips about a mandrel to produce laminated tubes of the kind specified, a winding head for controlling the feeding of the flexible strips to the mandrel and comprising, a front and a rear end frame mounted on the winding machine around the mandrel thereof at spaced positions therealong; a series of carrier rods extending from one of the said end frames to the other, said carrier rods being arranged relatively to one another in angularly spaced positions around the mandrel with their axes converging from the said front end frame to the rear end frame so that they are obliquely disposed with respect to the mandrel, a cylindrical guide roller mounted coaxially on each of said carrier rods for rotation about and for adjustment along such carrier rod whereby the several rollers may be set at relatively spaced positions along the mandrel; a pair of end collars for each of said rollers, such collars being arranged one at each end of the roller and being coaxial with, of larger external diameter than, and axially adjustable with, the roller; said rear end frame being adjustable about the axis of the mandrel and having the inner ends of said carrier rods swivellingly attached thereto so that these rod ends may be adjusted around the mandrel with said rear end frame; and said carrier rods having their outer front ends adjustably mounted each in a slot in the said front frame so as to be adjustable in the frame to and from the said mandrel, the said end adjustments of the ends of the said carrier rods providing a means for setting each such rod in such a position that the portion of its guide roller surface at which the corresponding flexible strip leaves the roller to pass to the mandrel is substantially tangential throughout its length to that surface on to which the strip is to be wound and the axis of the said roller is at the appropriate angle to the mandrel to achieve the required angular presentation of its strip to the mandrel.

10. In a machine for winding flexible strips about a mandrel to produce laminated tubes of the kind specified, a winding head for controlling the feeding of the flexible strips to the mandrel and comprising, a front and a rear end frame mounted on the winding machine around the mandrel thereof at spaced positions therealong; a series of carrier rods extending from one of the said end frames to the other, said carrier rods being arranged relatively to one another in angularly spaced positions around the mandrel with their axes converging from the said front end frame to the rear end frame so that they are obliquely disposed with respect to the mandrel, a cylindrical guide roller mounted coaxially on each of said carrier rods for rotation about and for adjustment along such carrier rod whereby the several rollers may be set at relatively spaced positions along the mandrel; a pair of end collars for each of said rollers, such collars being arranged one at each end of the roller and being coaxial with, of larger external diameter than, and axially adjustable with, the roller; said rear end frame being adjustable about the axis of the said mandrel and having the inner ends of said carrier rods attached thereto so that these rod ends may be adjusted around the mandrel with said rear end frame; and said carrier rods having their outer front ends adjustably mounted each in a slot in the said front frame so as to be adjustable in the frame to and from the said mandrel; means for adjusting the opposite ends of the said carrier rods independently; the said end adjustments of the ends of the said carrier rods providing a means for setting each such rod in such a position that the portion of its guide roller surface at which the corresponding flexible strip leaves the roller to pass to the mandrel is substantially tangential throughout its length to that surface on to which the strip is to be wound and the axis of the roller is at the appropriate angle to achieve the required angular presentation of its strip to the mandrel; and a strip tensioning device mounted on each of said carrier rods, there being one such device for each of said rollers and each tensioning device being adapted to apply tension to the strip guided by the adjacent guide roller over that part of the strip extending between the said guide roller and the mandrel of the winding machine, each said strip tensioning device comprising an element having a slot through which the strip to be tensioned is passed, such slotted element being arranged with the length of its slot parallel to the axis of the adjacent guide roller but spaced from such roller, the tensioning element being adjustable about an axis parallel to and closely adjacent to the said slot to vary the tension on the strip passing through the slot, and also being bodily adjustable about the axis of the said adjacent guide roller.

11. In a machine for winding flexible strips about a mandrel to produce laminated tubes of the kind specified, a winding head for controlling the feeding of the flexible strips to the mandrel and comprising, a front and a rear end frame mounted on the winding machine around the mandrel thereof at spaced positions therealong; a series of carrier rods extending from one of the said end frames to the other, said carrier rods being arranged relatively to one another in angularly spaced positions around the mandrel with their axes converging from the said front end frame to the rear end frame so that they are obliquely disposed with respect to the mandrel, a cylindrical guide roller mounted coaxially on each of said carrier rods for rotation about and for adjustment along such carrier rod whereby the several rollers may be set at relatively spaced positions along the mandrel; a pair of end collars for each of said rollers, such collars being arranged one at each end of the roller and being coaxial with, of larger external diameter than, and axially adjustable with, the roller; said rear end frame being adjustable about the axis of the said mandrel and having the inner ends of said carrier rods swivellingly attached thereto so that these ends may be adjusted around the mandrel with said rear end frame; mechanical means for adjusting the said rear end frame about the mandrel; said carrier rods each being formed in two parts, a long and a short part, connected together by a universal joint adjacent the said front frame and having the front ends of its said short part adjustably mounted in an individual slot in the said front frame so as to be adjustable in the frame to and from the said mandrel; a cam device mounted on said front end frame for oscillation about the axis of the mandrel relatively to the said front frame for adjusting the front ends of all said carrier rods simultaneously outwardly or inwardly with respect to the mandrel; the said end adjustments of the carrier rods providing a means for setting each such rod in such a position that the portion of the guide roller surface at which the corresponding flexible strip leaves the roller to pass to the mandrel is substantially tangential throughout its length to that surface on to which the strip is to be wound and the axis of the roller is at the appropriate angle to achieve the required angular presentation of its strip to the mandrel; and a strip tensioning device mounted on each of said carrier rods, there being one such device for each of said rollers and each tensioning device being adapted to apply tension to the strip guided by the adjacent guide roller over that part of the strip extending between the said guide roller and the mandrel of the winding machine, each said strip tensioning device comprising an element having a slot through which the strip to be tensioned is passed, such slotted element being arranged with the length of its slot parallel to the axis of the adjacent guide roller but spaced from such roller, the tensioning element being adjustable about an axis parallel to and closely adjacent to the said slot to vary the tension on the strip passing through the slot, and also being bodily adjustable about the axis of the said adjacent guide roller.

12. A stationary winding head for a machine for winding a plurality of flexible strips about a mandrel to produce a laminated tube of the kind specified, such winding head being adapted to control the feeding of the flexible strips to the mandrel and comprising a supporting structure adapted to be mounted on the winding machine; a series of carrier rods mounted in the said supporting structure in side by side laterally spaced convergent relationship in an arch such that, when the said supporting structure is applied to the winding machine in its operative position, the said carrier rods will be arranged with the centre of curvature of the said arch on the axis of the said mandrel and with the said rods in longitudinally oblique and converging relationship with such mandrel; a guide roller on each of said carrier rods, said guide rollers being independently axially adjustable along their respective guide rods, the several guide rollers on the various carrier rods thereby being adapted for setting at longitudinally relatively spaced positions with respect to the said mandrel; a pair of end collars for each of said rollers, such collars being axially adjustable with their rollers; and a strip tensioning device for each of the said rollers, each such tensioning device comprising an element having a slot through which the strip to be tensioned may be passed, such slotted element being arranged with the length of its slot parallel to the axis of the adjacent guide roller, the said tensioning element being adjustable about an axis parallel to and closely adjacent the said slot to vary the tension on a strip passing through the slot, and also being bodily adjustable about the axis of the said adjacent guide roller.

13. A winding head for a machine for winding a plurality of flexible strips about a core to produce thereabout a laminated tube of the kind specified, such winding head being adapted to control the feeding of the flexible strips to the said core and comprising a supporting structure adapted to be stationarily fixed to the winding machine; a series of carrier rods mounted in the said supporting structure in laterally spaced but convergent relationship such that, when the said supporting structure is applied to the winding machine in its operative position, the said carrier rods will be arranged about the said core in a convergent arch, the axis of the arch being coincident with the axis of the said core; a guide roller on each of at least some of the said carrier rods, such rollers being independently axially adjustable along their respective carrier rods for setting at longitudinally relatively spaced positions with respect to the said core; and a strip tensioning device for each of the said rollers, such tensioning devices each comprising a strip tensioning element adapted to engage and to flex the strip fed thereto transversely out of its line of feed, and means for carrying said element on the same carrier rod as the guide roller with which the element co-operates and also permitting adjustment of the said element about the said carrier rod.

14. For a machine for winding flexible strips about a mandrel to produce laminated tubes of the kind specified, a winding head for controlling the feeding of the flexible strips to the mandrel and comprising a supporting structure adapted to be stationarily mounted upon the winding machine; a series of carrier rods all supported in such supporting structure so as to extend in the same general direction as the said mandrel, such carrier rods being arranged relatively to one another in angularly spaced positions in an arch around the said mandrel with their axes converging from the front end of the said supporting structure to the rear end thereof so that the carrier rods are obliquely disposed with respect to the mandrel, a guide roller mounted coaxially on each of said carrier rods for rotation about such carrier rod; means for adjusting each of said rollers independently of the others upon its carrier rod so that the several rollers may be set at different positions along their respective carrier rods with respect to the mandrel, means for adjusting the said carrier rods at one end in the said supporting structure transversely of their axes and inwardly or outwardly with respect to the said mandrel, and means for adjusting the said carrier rods at their other ends transversely of their axes in a circle concentric with the mandrel.

15. In a machine for winding flexible strips about a mandrel to produce laminated tubes of the kind specified, a winding head for controlling the feeding of the flexible strips to the mandrel and comprising, a front and a rear end frame stationarily mounted on the winding machine around the mandrel thereof at spaced positions therealong; a series of carrier rods extending from one of the said end frames to the other end frame, such carrier rods being arranged relatively to one another in angularly spaced positions around the mandrel with their axes converging from the said front end frame to the rear end frame so that they are obliquely disposed with respect to the mandrel; such carrier rods also being supported in the said frames so as to be adjustable transversely of their own axes and with respect to the mandrel, means for simultaneously effecting the said transverse adjustment of all the said carrier rods; a cylindrical guide roller mounted coaxially on each of said carrier rods for rotation about and for adjustment along such carrier rod whereby the several rollers may be set at relatively spaced positions along the mandrel; a pair of end collars for each of said rollers, such collars being arranged one at each end of the roller and being coaxial with, of larger external diameter than, and axially adjustable with, the roller; and an adjustable strip tensioning device mounted on each of said carrier rods, there being one such device for each of said rollers and each tensioning device being adapted to apply tension to the strip guided by the adjacent guide roller over that part of the strip extending between the said guide roller and the mandrel of the winding machine.

ALFRED A. HODGE.

REFERENCES CITED

The following references are of record in the file of this patent:

UNITED STATES PATENTS

| Number | Name | Date |
|---|---|---|
| 1,258,731 | Yingling | Mar. 12, 1918 |
| 1,932,942 | Thordarson | Oct. 31, 1933 |